June 5, 1934.  J. W. LEMON  1,961,561
HARROW DISK FOR BEARINGS THEREFOR
Filed Dec. 16, 1933  2 Sheets-Sheet 2
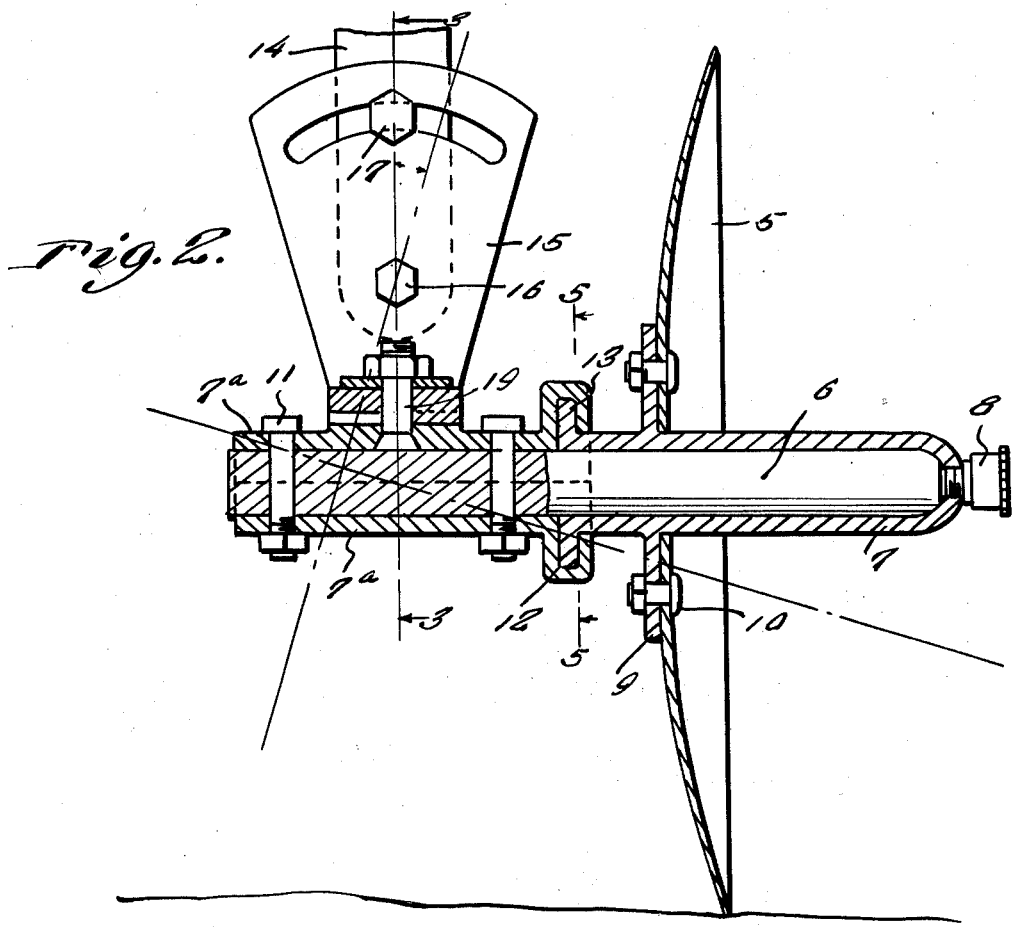
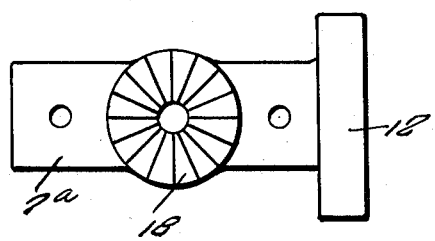
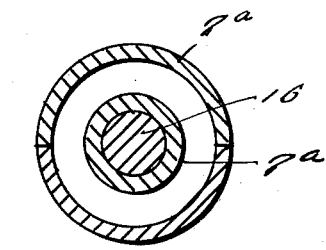
Inventor
John W. Lemon
By Clarence A. O'Brien
Attorney Patented June 5, 1934

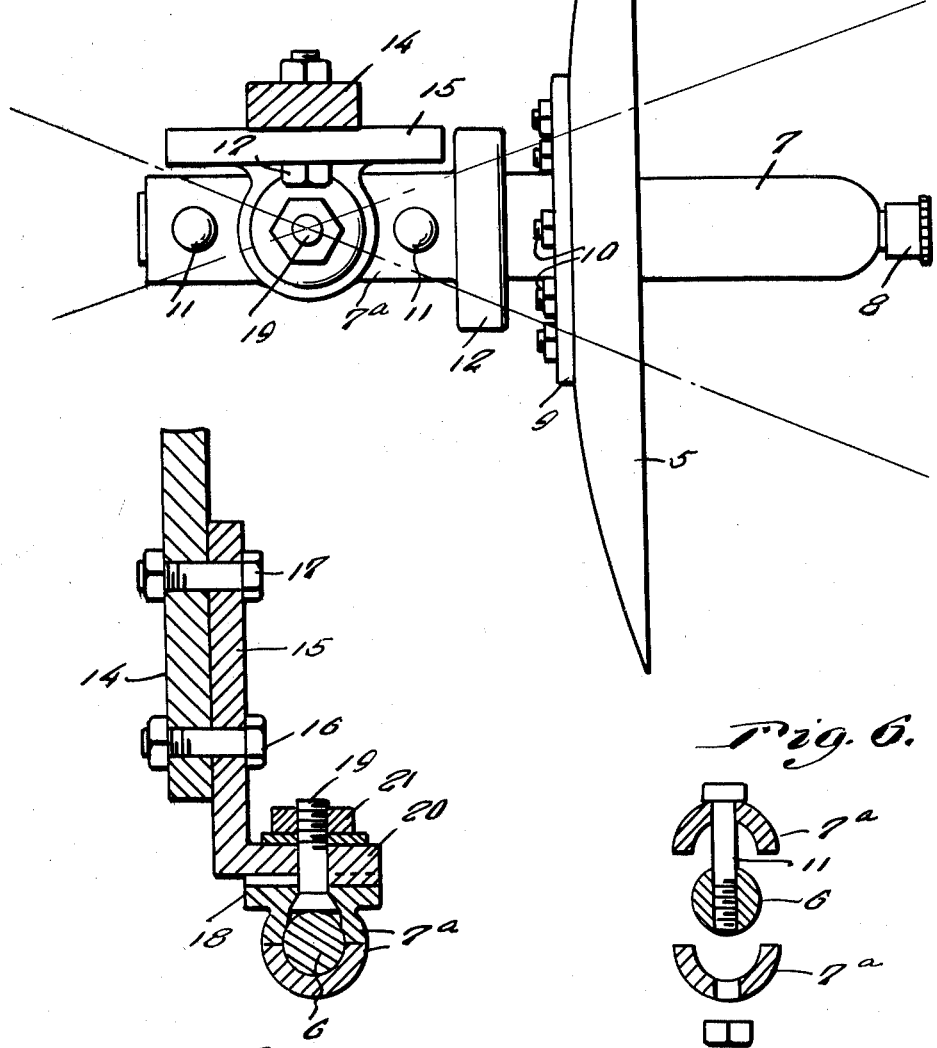

1,961,561

UNITED STATES PATENT OFFICE 1,961,561

HARROW DISK AND BEARINGS THEREFOR

John W. Lemon, Roy, N. Mex.

Application December 16, 1933, Serial No. 702,807

1 Claim. (Cl. 97—217)

This invention has reference to means for supporting and mounting a disk harrow on an agriculture machine and the object of the invention is to provide an improved device for mounting the disk harrows in a manner to permit a wide range of adjustment.

A still further object of the invention is to provide an improved bearing structure that will at all times be maintained free from grit and foreign matter.

The invention together with its objects and advantages will be best understood from a study of the following description taken in connection with the accompanying drawings wherein:

Figure 1 is a top plan view of the invention.

Figure 2 is a vertical sectional view therethrough.

Figures 3 and 5 are detail sectional views taken substantially on the lines 3—3 and 5—5 respectively of Figure 2.

Figure 4 is a plan view of one of the bearing members, and

Figure 6 is a detail sectional view through a portion of the bearing with the parts thereof shown separated.

Referring to the drawings by reference numerals it will be seen that 5 indicates a conventional harrow disk, and in accordance with the present invention the axle 6 has one end thereof fitted within a substantially tubular housing or bearing 7 that at its closed end is provided with a suitable lubricant fitting 8. Adjacent its opposite end the housing or bearing 7 is provided with an annular flange 9 to which is secured by bolts or other suitable fastening elements 10 the disk 5 to rotate with the bearing or housing 7 about the axle 6.

The opposite end of the axle 6 is secured within a bearing or housing section 7a which as shown in the drawings is slit longitudinally into two complemental half sections which are secured on the axle end 6 through the medium of bolt and nut means 11 as will be clear from a study of Figures 2 and 6.

As is apparent the axle bearing section formed of the parts 7a is fixed relative to the axle 6 and at one end thereof the sections of said bearing 7a are provided with outstanding flanges provided with internal grooves 12 which accommodate an annular flange 13 provided on the axle housing or bearing section 7 to provide a swivel joint between the axle housing or bearing sections that will serve to efficiently close the inner end of the bearing or housing section 7 precluding the entrance of dirt, grit or other foreign matter within the bearing or housing section 7. Accordingly, and through the provision of the lubricant fitting 8 the bearing will be at all times in a well lubricated condition.

The hanger bar of the agricultural machine is designated generally by the reference numeral 13 and for suspending the disk and associated parts from the bar 14 there is provided a bracket plate 15 that is pivotally mounted on the lower end of the bar 14 by bolt and nut means 16, and has a bolt and slot connection at its upper end with the hanger bar 14 as at 17. Obviously by tightening the bolt and nut means 17 the bracket 15 will be secured at the desired angular adjustment. In this manner the disk 5 may be canted to the desired degree and will be secured at the desired angle to the perpendicular as indicated by the broken lines in Figure 2.

On its top the sectional part 7a of the bearing or axle is provided with a disk 18 that on its top face is provided with a circular series of ratchet teeth as shown in Figure 4. Extending upwardly through the top of the bearing or housing section 7a, and the disk 18 is a pivot bolt 19. On its lower end the bracket plate 15 is provided with a ratchet tooth equipped plate 20 complemental to the disk 18, and the plate 20 is apertured to accommodate the upper end of the bolt 19 that is equipped with a suitable nut 21. Obviously by loosening the nut 21 axle 6 and its associated parts may be swung on a horizontal plane either to the right or left as indicated by the dotted lines in Figure 1 for placing the cultivator disk 5 diagonally to the line of draft.

From the above it will be seen that the mounting for the disk 5 embodying the features of the present invention provides for a wide range of adjustment both laterally and vertically, and that at the same time the parts may be maintained in a well lubricated condition and substantially free at all times from grit and other foreign matter.

Having thus described my invention, what I claim as new is:

A cultivator disk mounting comprising an axle, a housing for the axle including swivelly connected sections one of which is fixedly secured to the axle and the other of which is revoluble about the axle, means for securing the first named section to the axle, a flange on the other of the housing sections, a cultivator disk having a centrally located aperture accommodating the second named housing section, means securing said disk to the flange of the last named housing section, and a suspension bracket associated with the first named housing section and provided with means for attachment to the hanger beam of an agricultural machine, said bracket including a plate adapted to be pivotally connected with said hanger beam, bolt and slot means connecting said plate and hanger beam for securing the plate at the desired angular adjustment, a ratchet disk on the first named housing section, a complemental ratchet disk on said bracket plate cooperable with the first named ratchet disk for holding said axle and associated parts at the desired angular adjustment, and a bolt carried by the first named axle section and extending through said complemental ratchet disks, and nut means engaged with the bolt for securing the ratchet disks with their teeth in engaged position for holding the axle and associated parts in adjusted position.

JOHN W. LEMON.